United States Patent Office 2,719,059
Patented Sept. 27, 1955

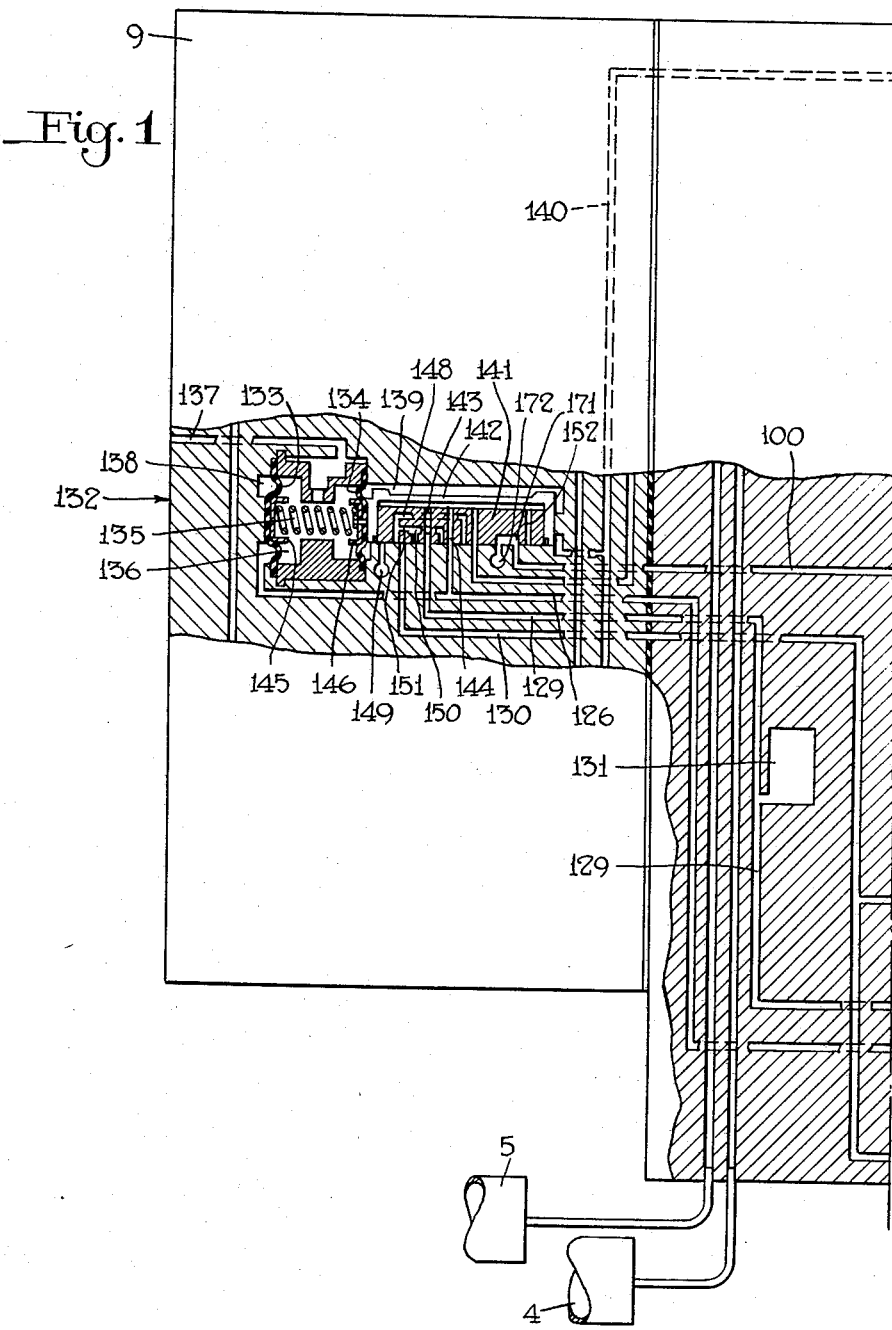

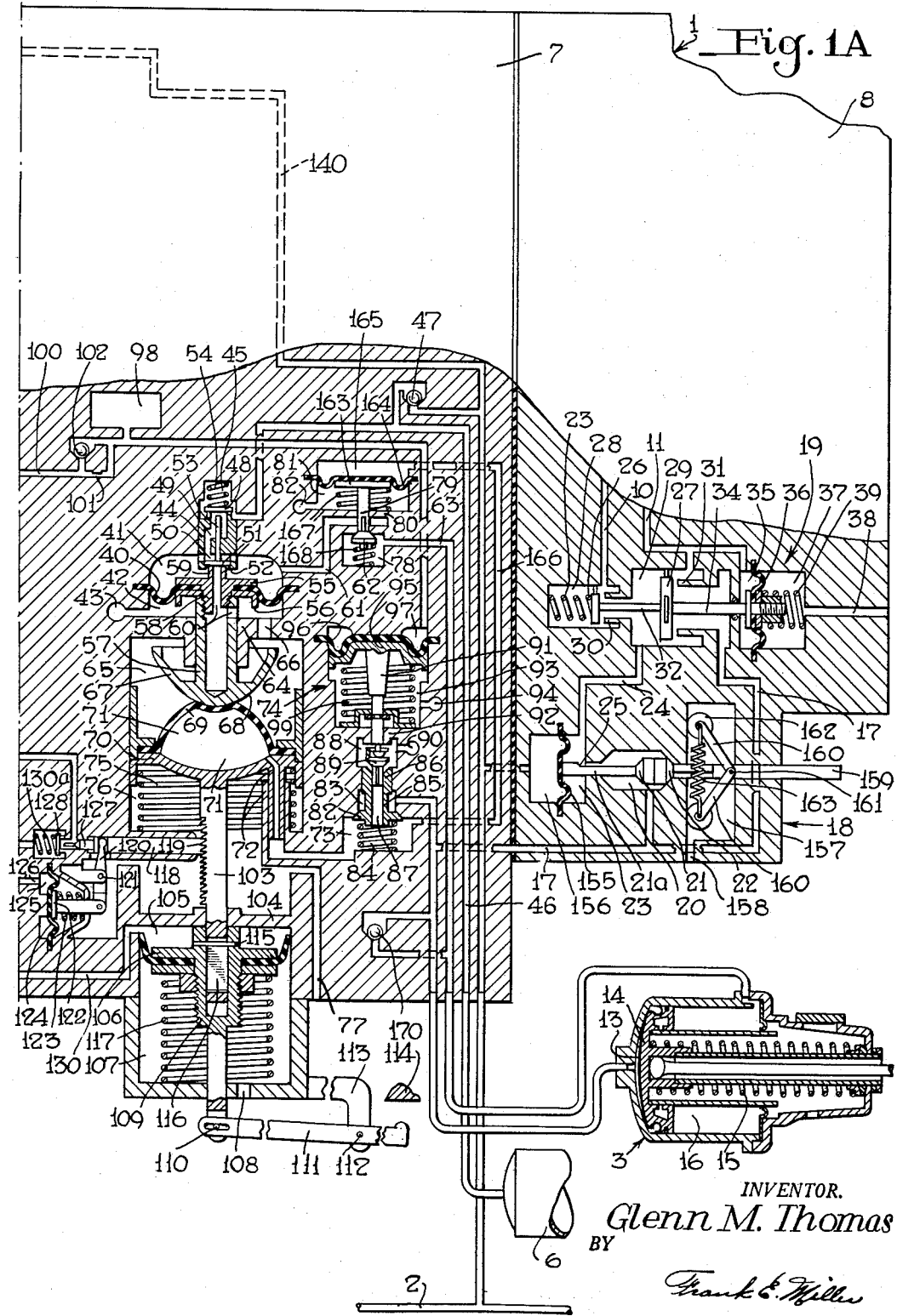

2,719,059

LOAD COMPENSATING FLUID PRESSURE BRAKE APPARATUS

Glenn M. Thomas, Dravosburg, Pa., assignor to Westinghouse Air Brake Company, Wilmerding, Pa., a corporation of Pennsylvania Application August 30, 1951, Serial No. 244,301

7 Claims. (Cl. 303—22)

This invention relates to fluid pressure brake apparatus and more particularly to the type for varying the degree of brake application on a vehicle in accordance with the load on the vehicle.

In the pending application of Earle S. Cook, Serial No. 238,918, filed July 27, 1951, there is disclosed an apparatus of the above type comprising a flexible diaphragm engaging on one side a movable follower of a supply valve device and which is adapted to be operated by fluid under pressure acting on the opposite side to actuate said device to supply fluid under pressure to limit the degree of brake application on a vehicle. The diaphragm is carried by a movable element and both the diaphragm and element are adjustable, upon charging the usual brake pipe on a vehicle, relative to the follower so as to vary the area of contact between the follower and diaphragm according to the load on the vehicle whereby for any chosen actuating pressure on the diaphragm the pressure of fluid supplied by the device will vary according to vehicle load to thereby vary the degree of braking of the vehicle according to the degree of load thereon. A latch is provided to cooperate with teeth on the diaphragm carrying element to hold the diaphragm and carrying element in an adjusted condition. The latch is releasable to permit adjustment of the diaphragm and element and a spring acting on said diaphragm and element is provided to move same to a position corresponding to a fully loaded vehicle upon release of the latch and prior to such adjustment. It is undesirable that the diaphragm be subjected to pressure of fluid at the time the latch is released, for the expansion force of the fluid on the diaphragm will move the carrying element relative to the latch and damage the latch teeth. It is further undesirable that the diaphragm and carrying element move to a position corresponding to a fully loaded car upon initiating an adjustment thereof for in case of failure of the latch, as for example, on an empty vehicle the degree of subsequent braking thereof would be that required for a fully loaded vehicle and not only cause said vehicle to assume a greater share of braking of a train than it should, but it might cause sliding of the vehicle wheels necessitating replacement thereof, or it might result in the wheels and axles of the vehicle being displaced from their normal relation to the vehicle.

The principal object of the invention is therefore the provision of an improved brake apparatus of the above general type having means for relieving the diaphragm of pressure of fluid before releasing the latch and which in case of latch failure will automatically cause the diaphragm and carrying element to assume the position for braking of an empty vehicle.

Other objects and advantages will become apparent from the following more detailed description of the invention.

In the accompanying drawings, Figs. 1–1A, when matched with the right hand edge of Fig. 1 against the left hand edge of Fig. 1A, is a diagrammatic view, partly in section and partly in outline, of a fluid pressure brake apparatus embodying the invention.

Description

As shown in the drawings, the brake apparatus comprises a brake controlling valve device 1, embodying the invention, the usual brake pipe 2, a brake cylinder device 3, an auxiliary reservoir 4, emergency reservoir 5 and a load reservoir 6.

The brake controlling valve device 1 comprises a pipe bracket 7 upon one face of which is mounted a service application valve device 8 and on an opposite face an emergency application valve device 9. The valve devices 8 and 9 may be identical to corresponding devices disclosed in the Cook application above referred to in view of which a brief description of each is believed to be adequate in the present application to an understanding of the invention.

Briefly, the service application valve device 8 comprises means (not shown) operative upon a service reduction in pressure in brake pipe 2 to vent fluid under pressure from said brake pipe to a passage 10 for effecting a quick service reduction in brake pipe pressure for the usual purpose and to also supply fluid under pressure from the auxiliary reservoir 4 to a passage 11 to a degree corresponding to the reduction in brake pipe pressure. The emergency application valve device 9 comprises means (not shown) operative upon an emergency reduction in brake pipe pressure to supply fluid under pressure from the emergency reservoir 5 to passage 11, the service application valve device 8 also operating under this condition the same as upon a service reduction in brake pipe pressure, so that fluid under pressure will also be supplied from the auxiliary reservoir 4 to said passage. Upon recharging of brake pipe 2 after either a service or an emergency application of brakes, the parts of the service and emergency valve device will be returned to normal position for venting passage 11 to atmosphere and for recharging the auxiliary reservoir 4 and emergency reservoir 5 in the usual manner.

The fluid under pressure supplied to passage 11 upon either a service or emergency reduction in pressure in the brake pipe 2 is adapted to become effective through a communication, which will be presently described, in a pressure chamber 13 of the brake cylinder device 3 wherein it will act on a piston 14 to move same against a release spring 15 to apply vehicle brakes to either a service or emergency degree, dependent upon the reduction in pressure in brake pipe 2. Upon release of fluid under pressure from chamber 13 the release spring 15 will move piston 14 to its usual release position to release vehicle brakes. At the side of piston 14 opposite chamber 13 is a so called compensating chamber 16 to which fluid under pressure is adapted to be supplied, as will be later described, for opposing and thereby limiting the brake applying pressure of piston 14 by fluid under pressure provided in chamber 13.

The brake cylinder pressure chamber 13 is open to a passage 17 leading to a manually operative release and reapplication valve device 18 and a combined quick service limiting and emergency inshot valve device 19.

The valve device 18 comprises a chamber 20 open to the brake cylinder passage 17 and containing two engaging but oppositely seating poppet valves 21, 22. The valve 21 is arranged to control communication between chamber 20 and a chamber 23 via an emergency delay communication which is restricted as by a groove 25 in a stem 21a projecting from said valve into chamber 23. Chamber 23 is open to a passage 24 and in said chamber the end of stem 21a is adapted to be engaged by one side of a flexible diaphragm 155 at the opposite side of which is a chamber 156 in constant communication with brake pipe 2. The poppet valve 22 controls communication between chamber 20 and a chamber 157 which is open to atmosphere via vent 158. A stem 159 projects from valve 21 through chamber 157 to the exterior of the device for operation by a trainman. In chamber 157 two oppositely extending toggle arms 160 are pivoted at their adjacent ends on a pin 161 carried by rod 159. In the opposite end of each arm 160 is a roller 162, the two rollers being connected together at their axes by a toggle spring 163 which is under tension.

With the rollers 162 in engagement with the inner end wall of chamber 157, as shown in the drawing, the spring 163 is adapted to hold valve 22 seated and permit unseating of valve 21. Upon manual movement of rod 159 inward of the device, the line of action of spring 160 is adapted to be transferred to the opposite side of pin 161 whereby said spring will flip the rollers 162 into engagement with the opposite or outer end wall of chamber 20 and then urge the valve 21 against its seat. The valves 21, 22 may be thus selectively seated and unseated by manual operation of rod 159 when diaphragm chamber 156 is void of fluid under pressure but when said chamber is charged with fluid under pressure from brake pipe 2, the pressure of such fluid acting on diaphragm 155 is adapted to unseat valve 21 and seat valve 22, as shown in the drawing.

The combined quick service limiting and inshot valve device 19 comprises two check valves 26, 27 contained in chambers 28, 29 which are open, respectively, to the quick service passage 10 and to passage 11, passage 24 being also open to chamber 29. The check valve 26 is arranged to cooperate with a seat 30 to close a communication between chambers 28, 29, while check valve 27 is arranged to cooperate with a seat 31 to close communication between chamber 29 and passage 17. The two check valves 26, 27 are arranged to seat in the same direction and are connected together by a stem 32. A spring 33 in chamber 28 acts on check valve 26 to urge same and the check valve 27 toward their seats. A stem 34 engaging the seating side of check valve 27 extends through a bore in a wall separating passage 17 from a chamber 35 and in chamber 35 is connected centrally to a flexible diaphragm 36. Chamber 35 at one side of diaphragm 36 is open to passage 11 while at the opposite side of said diaphragm is a chamber 37 which is open to atmosphere through a vent 38. A spring 39 in chamber 37 acts on the diaphragm 36 with a chosen force.

When passage 11 and chamber 35 are vented, as with the service application valve device 8 in its release position, spring 39 will unseat valves 27 and 26. Upon a service reduction in brake pipe pressure, the fluid under pressure supplied from the brake pipe 2 to passage 10 will flow past check valve 26 to chamber 29 and there be joined with the fluid under pressure supplied from the auxiliary reservoir 4 and flow past check valve 27 to passage 17 and thence to the brake cylinder pressure chamber 13. Upon a chosen increase in pressure in passage 11 and chamber 35 diaphragm 36 will deflect against spring 39 to permit seating of check valves 26, 27. The seating of check valve 26 will prevent further quick service reduction in pressure in brake pipe 2 while upon closing of check valve 27, fluid still being supplied to chamber 29 from the auxiliary reservoir 4 will flow through passage 24, the groove 25 in valve stem 21a and chamber 20 to passage 17 and thence to the brake cylinder pressure chamber 13, the groove 25 offering substantially no restriction to such flow of fluid under pressure.

When fluid under pressure is supplied to passage 11 by operation of both the service and emergency application valve devices 8, 9, respectively, upon an emergency reduction in brake pipe pressure, a very rapid flow will occur past the inshot check valve 27 until sufficient pressure is obtained in chamber 35 to deflect diaphragm 36 against spring 39 to permit seating of said check valve. After the check valve 27 thus seats, further flow of fluid under pressure to the brake cylinder pressure chamber 13 will be limited to the flow capacity of the slow build up choke or groove 25 in the valve stem 21a.

It will therefore be seen that in effecting a service application of brakes, the closing of check valve 26 will limit the degree of quick service venting of fluid under pressure from the brake pipe 2, while in effecting an emergency application of brakes, the closing of check valve 27 will limit the rapid flow or well-known emergency inshot of fluid under pressure to the brake cylinder pressure chamber 13, after which the slot 25 in the valve stem 21a will limit emergency flow of fluid under pressure to said chamber to the usual gradual rate, said slot being substantially without effect, however, upon flow of fluid under pressure to the brake cylinder pressure chamber 13 in effecting a service application of brakes, as above mentioned.

In the pipe bracket 7 there is a flexible diaphragm 40 of a compensating valve device, said diaphragm being subject on one side to pressure of fluid in a chamber 41 and on the opposite side to pressure of fluid in a chamber 42 which is open to atmosphere through a vent 43. A bushing 44 pressed into the casing of the device has one end disposed in chamber 41 while at its opposite end is a chamber 45 adapted to be constantly supplied with fluid under pressure via passage 46 from the load reservoir 6 which is adapted to be charged with fluid under pressure from the brake pipe 2 past a check valve 47. Chamber 45 contains a supply valve in the form of a check valve 48 arranged to cooperate with a seat on the end of bushing 44 to close communication between chamber 45 and a passage 49 extending through said bushing to chamber 41. In the lower end of bushing 44 is a chamber 50 containing a release valve 51 normally supported on an inturned annular shoulder 52 on bushing 44. A pin 53 slidably mounted in a bore of bushing 44 is supported at one end on valve 51 with its other end disposed for contact with the seating side of the supply valve 48 for unseating said supply valve upon movement of release valve 51 upward in chamber 50. A spring 54 in chamber 45 acts on the supply valve 48 to seat same upon downward movement of the release valve 51 in chamber 50.

The diaphragm 40 is clamped between two followers 55, 56 disposed in chambers 41, 42, respectively, by means of a stem 57 having screw-threaded engagement with a stud-like portion 58 of follower 55 disposed in chamber 42. Projecting from the opposite side of follower 55 is a reduced portion 59 extending through the shoulder 52 in bushing 44 and provided on its end with a seat for the release valve 51 which is arranged to control communication through said seat between the release valve chamber 50 and a passage 60 extending through the follower and opening to atmosphere via chamber 42 and vent 43. The reduced portion 59 of the diaphragm follower 55 and the release valve 51 constitute a strut between the diaphragm 40 and the supply valve operating pin 53 whereby upward deflection of diaphragm 40 will unseat the supply valve 48 to supply fluid under pressure to chamber 41 and thence through a passage 61, past a normally open cut-off valve 62 and through a passage 63 to the compensating chamber 16 of the brake cylinder device 3. Downward deflection of diaphragm 40, after seating of supply valve 48 will unseat the follower reduced portion 59 from the release valve 51 for venting diaphragm chamber 41 and passage 61 and thereby the brake cylinder compensating chamber 16 past the cut-off valve 62 when open.

The stem 57 projects through and is slidably mounted in a partition wall 64 separating chamber 42 from a chamber 65 which is open to atmosphere via port 66 in said wall and the chamber 42. In chamber 65, the end of stem is connected to a follower 67 having a face 68 which is preferably parabolic in contour and arranged to engage the outer face of an inverted, substantially cup shaped, flexible diaphragm 69. The diaphragm 69 is clamped around its edge to a piston like structure 70 which is slidably mounted in the casing and cooperates with said structure to form within the diaphragm or between said diaphragm and piston 70 a pressure chamber 71 which is open through a slip joint connection 72 between the structure and casing of the device with a chamber 73 of an unloading valve device 74. A spring 75 provided in a chamber 76 at the side of the piston like structure 70 opposite chamber 65 urges said structure in the direction of diaphragm 69. Chamber 76 is open to atmosphere via a passage 77.

The cut-off valve 62 which controls communication between passages 61 and 63 is contained in a chamber 78 open to passage 63 and has a stem 79 extending through passage 61 and a partition wall 80 is slidable contact with the wall of a bore therein into a chamber 81 which is open to atmosphere via vent 82. In chamber 81 the end of stem 79 engages a follower plate 163 which is in contact with one side of a flexible diaphragm 164 at the opposite side of which is a pressure chamber 165 which is open through a passage 166 to chamber 73 in the unloading valve device 74. A light spring 167 in chamber 81 acts on diaphragm 164 biasing same in a direction to permit closing of valve 62, while a bias spring 168 acts on said valve urging it to closed position.

The unloading valve device 74 comprises a valve 82 contained in chamber 73 for controlling communication between said chamber and a chamber 83 which is open to the brake cylinder passage 17, a spring 84 in chamber 73 acting on said valve to seat it and close said communication. The valve 82 is connected to one end of a stem 85 extending through chamber 83 and having its opposite end connected to one end of a plunger 86 which is slidably mounted in the casing. A passage 87 extending through the valve 82, stem 85 and plunger 86 is open at one end to chamber 73 and at the opposite end through a seat on the end of plunger 86 to chamber 88 containing a valve 89 arranged to cooperate with said seat to close communication between said passage and chamber 88. Chamber 88 is open to atmosphere via vent 90.

The valve 89 is connected to one end of a stem 91 projecting through a partition wall 92 from chamber 88 into a chamber 93 which is open to atmosphere via vent 94. The stem 91 is provided on its end in chamber 93 with a follower head 95 engaging one side of a flexible diaphragm 96 at the opposite side of which is a pressure chamber 97 which is open to a timing reservoir 98. A spring 99 in chamber 93 acts on the follower head 95 and diaphragm 96 urging same in a direction to open valve 89 and to permit closing of valve 82 by spring 99. The reservoir 98 is open to a passage 100 through a choke 101 and a by-pass communication of greater flow capacity than said choke and containing a check valve 102 arranged to permit flow of fluid under pressure in the direction from passage 100 to reservoir 98 but to prevent reverse flow except through choke 101.

Passage 17 connected to the brake cylinder pressure chamber 13 is open to passage 63 connected to the brake cylinder compensating chamber 16 via communication containing a check valve 170 arranged to permit flow of fluid under pressure only in the direction from the latter chamber to the former chamber.

The piston like structure 70 carrying the inverted cup shaped diaphragm 69 is connected to one end of a stem 103 extending through chamber 76 and a partition wall 104 into a pressure chamber 105. Chamber 105 is provided at one side of a strut piston 106 at the opposite side of which is a chamber 107 which is open to atmosphere through a vent 108. The piston 106 has a stem 109 projecting into chamber 105 for engagement with the adjacent side of partition wall 104 and also projecting through chamber 107 and a bore in the outer end wall of chamber 107 to the exterior of the device where its end is pivotally connected by a pin 110 to one end of a lever 111. A spring 117 in chamber 107 constantly urges piston 106 toward a normal position defined by contact with partition wall 104.

The lever 111 is fulcrumed between its ends on a pin 112 carried by a lug 113 projecting from the device casing, while its opposite end is arranged for contact with an unsprung portion 114 of a vehicle, it being understood that the brake controlling valve device 1 is to be carried by a sprung portion, such as the body of the vehicle, whereby the lever 111 will assume a position where its right hand end will be normally away from the unsprung portion 114 of the vehicle a distance which varies directly according to the load on the vehicle.

The stem 103 depending from the piston like structure 70 into chamber 105 is slidably mounted therein in a bore in the strut piston stem 109 which carries a pin 115 extending transversely through a slot 116 in the stem 103.

Assuming that a vehicle is fully loaded, the vehicle body and lever 111 will assume a lowermost position with respect to the unsprung portion 114 of the vehicle. Under this condition, when fluid under pressure is supplied to chamber 105 (as will be later described) such fluid will move the strut piston 106 downward until stopped by contact of lever 111 with the unsprung portion 114 of the vehicle where such movement will cease. During this movement of piston 106, the pin 115 carried thereby will engage stem 103 at the bottom of slot 116 and pull piston like structure 70 to the position in which it is shown in the drawing, if not already so positioned, against the resistance of spring 75. If the vehicle is less than fully loaded then movement of piston 106 by pressure of fluid in chamber 105 will be less than when fully loaded and such movement will be a minimum when the vehicle is empty so that the extent of downward movement of the piston like structure 70 will vary directly according to the load on the vehicle whereby the area of contact of diaphragm 69 with the follower 67 will be varied inversely according to the degree of load from a chosen minimum area of contact, as shown in the drawing, for a fully loaded vehicle to a chosen maximum area of contact when the vehicle is empty and under which latter condition the piston structure 70 may be in contact with the upper end wall of chamber 65.

Means to be presently described are provided to lock the piston like structure 70 in any position to which it may be adjusted by piston 106 upon supply of fluid under pressure to chamber 105, whereby upon release of fluid under pressure from chamber 105 the piston 106 will be moved by spring 117 relative to stem 103 back to normal position for moving lever 111 out of contact with the unsprung portion 114 of the vehicle, in which position these parts are shown in the drawing.

The numeral 118 designates a latch slidably mounted in the casing at right angles to the axis of stem 103 and having on one end teeth for locking engagement with teeth 119 formed along one side of said stem to hold the piston structure in an adjusted position. One end of a lever 120 adapted to rock on a fulcrum pin 121 is connected to latch 118 while its opposite end is connected to a follower 122 against which acts a spring 123 for operating said latch into locking engagement with the stem 103. A flexible diaphragm 124 engaging the follower 122 has one side in contact with follower 122 and at the opposite side there is a pressure chamber 125 which is open to a passage 126. Upon supply of fluid under pressure through passage 126 to chamber 125 the diaphragm 124 is adapted to actuate lever 120 to release latch 118 from stem 103.

Upon release of latch 118 from stem 103 a projection 127 of said latch is adapted to unseat a check valve 128 to open a passage 129 to a passage 130 connected to the strut piston chamber 105 while upon engagement of latch 118 with stem 103 said check valve is adapted to be closed by a spring 130a. Connected to passage 129 is a volume reservoir 131.

A cut-off valve device 132, constituting a portion of the emergency valve device 9, comprises two coaxially arranged and spaced apart flexible diaphragms 133, 134, the diaphragm 133 being of greater area than diaphragm 134. The two diaphragms are connected together by a spring 135 contained in a chamber 136 formed between the two diaphragms and open to atmosphere through a vent 137.

At the outer face of diaphragm 133 is a chamber 138 which is open to passage 126 while at the opposite face of diaphragm 134 is a valve chamber 139 which is open via passage 140 to the brake pipe 2. A slide valve 141 contained in chaber 139 is connected by a stem 142 to diaphragm 134 for movement therewith. Passages 100, 126, 129 and 130 all open at the seat of slide valve 141.

Operation

In operation, assume that the brake apparatus is void of fluid under pressure and, for reasons that will later become apparent, all parts of said apparatus are in the position in which they are shown in the drawing.

To initially charge the brake apparatus with fluid under pressure, fluid under pressure will be supplied to brake pipe 2 in the usual manner and thence flow through passage 140 to the service and emergency portions 8, 9, respectively, of the apparatus and then through the medium of said service portion charge the auxiliary reservoir 4 and emergency reservoir 5 as described in the Cook application above referred to.

At the same time fluid under pressure from passage 140 will flow past the check valve 47 and charge the load reservoir 6 and also become effective in valve chamber 139 of the cut-off valve device 132.

As fluid under pressure is thus supplied to the cut-off valve chamber 139, it will flow therefrom through a port 143 in slide valve 141 to passage 129 to charge the volume revervoir 131 and at the same time through a port 144 in said slide valve to passage 126 for charging the diaphragm chamber 138 of the cut-off valve device 132 and also to the unlatching diaphragm chamber 125.

When a chosen pressure of fluid is thus obtained in chamber 125, it will deflect diaphragm 124 against spring 122 and release latch 118 from stem 103 which will permit spring 75 to move the piston like structure 70 upward relative to piston 116 into contact with the upper end wall of chamber 65 and in which position the lower end wall of slot 116 will substantially engage pin 115, thereby moving the diaphragm 69 relative to the follower 67 to the position for an empty vehicle. After rod 118 releases the stem 103, it will unseat the check valve 128 whereupon the fluid under pressure in the volume reservoir 131 will suddenly equalize into passage 130 and thence into the strut piston chamber 105.

The fluid under pressure thus provided in the strut piston chamber 105 will move the piston 106 downward until stopped by engagement of lever 111 with the unsprung portion 114 of the truck. If the vehicle is empty such movement of the strut piston 106 will be very slight and just move pin 115 into contact with the lower end wall of slot 116 and not move the piston 70 from its upper empty vehicle position. On the other hand if the vehicle is fully loaded, such movement will return the piston like structure 70 to substantially the position in which it is shown in the drawing. If the vehicle is only half-loaded the piston structure 70 will be moved by the strut piston to a position substantially midway between its empty and full load positions. In other words, this operation of the strut piston 106 will pull the piston structure 70 downward from empty position a distance which varies according to the degree of load on the vehicle, whereby the area of contact of diaphragm 69 with the follower face 67 will be adjusted to a degree which varies inversely according to the degree of load on the vehicle.

The piston structure 70 will be adjusted, as just described, while the brake pipe 2 is charging to, for example, forty pounds pressure the gradual increase in brake pipe pressure in diaphragm chamber 138 of the cut off valve device 132 deflecting the diaphragm 133 against spring 135 during such increase for increasing the pressure of said spring on diaphragm 134 to hold said diaphragm and the slide valve 141 in the position in which they are shown in the drawing. This deflection of diaphragm 133 will however be limited by contact of a follower 145 with the casing whereupon a slight further increase in brake pipe pressure in chamber 139 to for example fifty pounds, will deflect diaphragm 134 against spring 135 and move slide valve 141 to a cut out position which may be defined by contact between a follower 146 and the casing.

In the cut out position of slide valve 141 a port 148 in said slide valve will connect passage 126 to a vent port 149 whereupon fluid under pressure will be promptly released from the latch diaphragm chamber 125 to permit spring 123 to move latch 18 into locking engagement with stem 103 to hold said stem and the piston like structure 70 in the position to which they were adjusted by pressure of fluid in chamber 105 acting on the strut piston 106. At the same time the strut piston chamber 105 will be placed in communication with the volume reservoir 131 via passages 130, 129 and connecting cavity 150 in slide valve 141 and both will be slowly vented via a restricted port 151 in said slide valve connecting cavity 150 to the vented port 148. By thus restricting the release of fluid under pressure from the chamber 105, the strut piston 106 will hold the piston like structure 70 in its adjusted position until after locking operation of latch 118, so that such adjustment will not change upon release of fluid under pressure from chamber 105 and return of piston 106 and lever 111 to normal position by spring 117.

With the cut-off slide valve 141 in its cut-in position in which it is shown in the drawing, diaphragm chamber 97 in the unloading valve device 74 is vented via passage 100, a cavity 171 in said valve and an atmospheric port 172 to permit spring 99 to open valve 89 and to permit spring 84 to close valve 82 for reasons which will be later described, but upon movement of said slide valve to its cut-out position, a port 152 in said slide valve registers with passage 100 to permit flow of fluid from valve chamber 139 to passage 100 and thence to the timing reservoir 98 and diaphragm chamber 97. When a chosen pressure of fluid is thus obtained in chamber 97 it will deflect diaphragm 96 against spring 99 and seat valve 89 and through plunger 86 unseat the valve 82 to open diaphragm chamber 71 in the piston like structure 70 to the brake cylinder passage 17.

When by operation of the service portion 8 or by both said portion and the emergency portion 9 of the brake controlling valve device 1, fluid under pressure is supplied to passage 17 and pressure chamber 13 of the brake cylinder device 3 to effect an application of brakes, fluid under pressure will flow from said passage past the open valve 82 in the unloading valve device 74 to chamber 73 therein and thence in one direction to chamber 165 wherein a slight pressure will deflect diaphragm 164 against spring 167 to open the cut off valve 62. At the same time fluid under pressure from chamber 73 will also flow to chamber 71 in the piston structure 70 wherein it will act on diaphragm 69 to press it against the follower 67. If the vehicle is fully loaded, the area of contact between diaphragm 69 and follower 67 will be so small that insufficient force will be exerted against said follower to unseat the supply 48 against spring 54 and pressure of fluid in chamber 45, but if said area of contact is greater, as for any degree of load on the vehicle less than full load, then sufficient force will be exerted by diaphragm 69 against the follower 67 to unseat the supply valve 48 whereupon fluid under pressure will be supplied past said valve to diaphragm chamber 41 and thence through passage 61 and past the open cut off valve 62 and through passage 63 to the brake cylinder compensating chamber 16. Fluid under pressure will thus continue to flow to the brake cylinder compensating chamber 16 until the pressure of such fluid acting in chamber 41 on diaphragm 40 is able to overcome the force exerted against follower 67 by diaphragm 69 whereupon diaphragm 40 will deflect and move the follower 67 against diaphragm 69 to permit seating of the supply valve 48. The pressure of fluid thus provided in the compensating chamber 16 of the brake cylinder device will thus be limited according to the area of contact between diaphragm 69 and follower 67 and hence according to the load on the vehicle, from a maximum value when the diaphragm 69 is adjusted for maximum contact with follower 67 with an empty vehicle to zero when adjusted for minimum contact with a fully loaded vehicle.

In the brake cylinder device 3, the pressure of fluid thus provided in the compensating chamber 16 opposes that in pressure chamber 13 and when of maximum value with an empty vehicle will limit the effectiveness of pressure of fluid in chamber 13 to apply the brakes to a minimum degree which is sufficient to brake the empty car while for any degree of load less than full load the pressure obtained in the compensating chamber will be less than with the vehicle empty in accordance with the degree of load in order to vary the effectiveness of pressure of fluid in chamber 13 to brake the vehicle in proportion to the degree of load.

When the vehicle is fully loaded and the area of contact of diaphragm between diaphragm 69 and follower 67 is unsufficient for moving said follower 67 by pressure of fluid in chamber 69, it will be noted that movement of the brake cylinder piston 14 by pressure of fluid in chamber 13 will tend to increase the pressure of fluid in the compensating chamber 16, but such increase being effective in chamber 41 on diaphragm 40 will deflect said diaphragm to open the release valve 51 for thereby minimizing such increase in order that the brakes on the vehicle will be applied with a force equal substantially to pressure of fluid in the pressure chamber 13, as desired for a fully loaded vehicle.

Now assume that the brake application just mentioned is in response to an emergency reduction in pressure in the brake pipe 2. When the brake pipe pressure becomes reduced to some relatively low pressure, such as twenty pounds, spring 135 in the cut off valve device 132 will return diaphragm 134 and slide valve 141 to their normal position in which they are shown in the drawing. In this position the timing reservoir 98 and diaphragm chamber 97 of the unloading valve device 74 will be vented to atmosphere through choke 101, passage 100 and thence via cavity 171 in the slide valve 141 and the vent port 172. When the pressure in chamber 97 is thus reduced sufficiently, spring 99 will deflect diaphragm 96 upward to unseat valve 89 and to permit seating of valve 82, thereby disconnecting diaphragm chamber 71 in the piston structure 70 and diaphragm chamber 165 from the brake cylinder passage 17 and opening said chambers to the atmospheric vent 90 whereby the diaphragms 69 and 164 will be relieved of pressure of fluid. The flow capacity of choke 101 is so related to the volume of timing chamber 98 as to delay operation of the unloading device 74 to vent diaphragm chambers 71 and 165 however until after the brakes on the vehicle have become fully applied in response to an emergency reduction in brake pipe pressure.

If after a service application of brakes the pressure of fluid in brake pipe 2 gradually leaks away, the cut off valve device 132 will operate the same as upon an emergency reduction in pressure in said brake pipe when brake pipe pressure becomes sufficiently low, to cause the unloading valve device 74 to operate to vent the diaphragm chamber 71 in piston structure 70 and to also vent the diaphragm chamber 165.

This venting of diaphragm chamber 71 when the brakes on a vehicle are applied is for the purpose of relieving the piston like structure 70 of pressure of fluid urging it against latch 118, so that upon recharging the brake apparatus with fluid under pressure the stem 103 will not be forced over said latch and damage the teeth 119 thereon or the cooperative teeth on the end of said latch. The venting of diaphragm chamber 165 is to permit closing of valve 62 by spring 168 thereby disconnecting the brake cylinder compensating chamber 16 from diaphragm chamber 40 so as to hold pressure of fluid in said compensating chamber upon venting of fluid under pressure from chamber 71. Otherwise compensating chamber pressure acting in chamber 41 on diaphragm 40 would deflect said diaphragm to open the release valve 51 and vent said compensaing chamber which is undesired with the brakes applied on a vehicle less than fully loaded.

If now the pressure of fluid in the brake pipe 2 is increased, the piston structure 70 will be readjusted, in the same manner as before described, in accordance with the load on the vehicle without opposition, it will be noted, from pressure of fluid in chamber 71. When the cut off slide valve 141 is moved to its outer or cut out position after adjustment of the piston structure 70 has been effected, the supply of fluid under pressure to diaphragm chamber 97 in the unloading device will actuate said device to reconnect chamber 71 in the piston structure 70 and also diaphragm chamber 165 to the brake cylinder passage 17. If fluid under pressure is still acting in the brake cylinder pressure chamber 13 such pressure then becoming effective on diaphragm 164 will open the cut off valve 62 and thereby the brake cylinder compensating chamber 16 to diaphragm chamber 41 while said pressure will at the same time become effective in diaphragm chamber 71 on diaphragm 69 whereby, in case of change of load on the vehicle the pressure in the compensating chamber 16 will be readjusted according to such change. If there has been no change in load, the pressure in the compensating chamber 16 will not be changed, as will be apparent.

If while the brake pipe 2 is vented, the pressure in the brake cylinder chambers 13, 16 has been released by leakage or manually, as will be presently described, then upon recharging of the brake pipe, the piston structure 70 will be merely adjusted according to the load on the vehicle upon recharging of the brake pipe, the unloading device 74 and cut off valve 62 serving no useful purpose under such condition.

When the brakes on the vehicle are applied in response to a reduction in brake pipe pressure, as above described, if the pressure of fluid in the brake pipe is increased, the fluid under pressure in the brake cylinder pressure chamber 13 and chamber 71 of the piston structure 70 will be released by flow through passage 17 to the vented passage 11 such flow unseated the emergency inshot check valve 27. Pressure of fluid in the compensating chamber 16 will then release past check valve 170 along to passage 17 with release of fluid under pressure from said passage.

When brakes are applied on the vehicle and the brake pipe 2 and thereby chamber 156 in the release and reapplication valve device 18 are completely vented, pressure of diaphragm 155 on the valve stem 21a will be relieved. If under this condition a trainman should desire to release the brakes on the vehicle, he will push rod 159 into the device to seat valve 21 and unseat valve 22. The unseating af valve 22 will release fluid under pressure from the brake cylinder pressure chamber 13 and if fluid under pressure is present in chamber 16, it will also release past check valve 170 and valve 22, while the valve 21 being seated will hold fluid under pressure remaining in the auxiliary reservoir 4. If the trainman desires to reapply the vehicle brakes, then by pulling rod 159 to close valve 22 and open valve 21 the brakes will be applied by fluid under pressure from the auxiliary reservoir 4. In this manner the brakes on the vehicle may, if desired, be released and reapplied until the auxiliary reservoir pressure in passage 11 becomes reduced sufficiently for spring 39 to open valve 27. After this occurs, pressure of fluid remaining in the auxiliary reservoir 4 will be vented past valve 22 if opened to release the brakes and a reapplication of the brakes can not then be effected.

*Summary*

It will now be seen that spring 75 will move the piston like structure 70 to its empty position in case of failure of the latch 118, failure of the strut piston 106 to operate as intended etc., so as to ensure empty braking of a vehicle regardless of the loaded condition thereof under such a condition, thereby precluding the possibility of braking an empty vehicle to a degree for a loaded vehicle with damaging results. The unloading device 74 by venting of chamber 71 prevents movement of the stem 103 relative to the latch 118 by such pressure, thereby minimizing possibility of damage to the teeth 119 on stem 103 and the teeth on the latch. The structure including the cut off valve 62 prevents release of fluid under pressure from the brake cylinder compensating chamber 16 upon release of fluid under pressure from the diaphragm chamber 71 to ensure that a brake application on a vehicle will remain at a desired degree when the brake pipe 2 is vented and upon recharging same and during readjustment of the piston structure 70 according to the loaded condition of the vehicle.

Having now described my invention, what I claim as new and desire to secure by Letters Patent, is:

1. In a vehicle fluid pressure brake apparatus, in combination, a brake cylinder device comprising a brake applying piston operable by fluid under pressure acting in one chamber to apply brakes on said vehicle and having a compensating chamber to which fluid under pressure is adapted to be supplied for opposing pressure of fluid in said one chamber, valve means controlled by pressure of fluid in said compensating chamber and an opposing force for varying pressure of fluid in said compensating chamber in accordance with the degree of such force, means for providing said force comprising a follower element and a flexible diaphragm element of normal substantially frusto-conical shape, arranged with its outer face in contact with said follower element and adapted to be pressed against said follower element by fluid under pressure acting on the opposite face of said diaphragm element, means connecting one of said elements to said valve means, means subjecting the other element to pressure of fluid in the first named chamber, adjusting means operable by fluid under pressure for adjusting said other element relative to said one element to vary the area of contact between said elements, latch means operable by fluid under pressure to release said other element for adjustment and upon release of fluid under pressure to hold said other element in an adjusted condition, resilient means acting on said other element operative upon release of said latch means to move said other element relative to said one element to the position corresponding to an empty vehicle, means operable by release operation of said latch means to supply fluid under pressure to said adjusting means and to cut off such supply upon release of fluid under pressure on said latch means, a brake pipe, and means operable during charging of said brake pipe to a chosen pressure to supply fluid under pressure to said latch means and upon attaining a higher pressure in said brake pipe to release fluid under pressure from both said latch means and adjusting means, and means for delaying the release of fluid under pressure from said adjusting means relative to the release of fluid under pressure from said latch means.

2. In a vehicle fluid pressure brake apparatus, in combination, a brake cylinder device comprising a brake applying piston operable by fluid under pressure acting in one chamber to apply brakes on said vehicle and having a compensating chamber to which fluid under pressure is adapted to be supplied for opposing pressure of fluid in said one chamber, valve means controlled by pressure of fluid in said compensating chamber and an opposing force for varying pressure of fluid in said compensating chamber in accordance with the degree of such force, means for providing said force comprising a follower element and a flexible diaphragm element of normal substantially frustoconical shape, arranged with its outer face in contact with said follower element and adapted to be pressed against said follower element by fluid under pressure acting on the opposite face of said diaphragm element, means connecting one of said elements to said valve means, means subjecting the other element to pressure of fluid in the first named chamber, adjusting means operable by fluid under pressure for adjusting said other element relative to said one element to vary the area of contact between said elements, latch means operable by fluid under pressure to release said other element for adjustment and upon release of fluid under pressure to hold said other element in an adjusted condition, resilient means acting on said other element operative upon release of said latch means to move said other element relative to said one element to the position corresponding to an empty vehicle, means operable by release operation of said latch means to open a fluid pressure supply communication to said adjusting means and to close such communication upon release of fluid under pressure on said latch means, a brake pipe, and cut off means controlled by brake pipe pressure operative with brake pipe pressure below a chosen degree to supply fluid from said brake pipe to said latch means and to said communication and upon an increase in brake pipe pressure above said chosen degree to release fluid under pressure from said latch means and adjusting means, and means for delaying such release of fluid under pressure from said adjusting means relative to release of fluid under pressure from said latch means.

3. In a vehicle fluid pressure brake apparatus, in combination, a brake cylinder device comprising a brake applying piston operable by fluid under pressure acting in one chamber to apply brakes on said vehicle and having a compensating chamber to which fluid under pressure is adapted to be supplied for opposing pressure of fluid in said one chamber, valve means controlled by pressure of fluid in said compensating chamber and an opposing force for varying pressure of fluid in said compensating chamber means in accordance with the degree of such force, means for providing said force comprising a follower element and a diaphragm element adapted to be pressed one against the other with fluid under pressure acting on said diaphragm element, means connecting one of said elements to said valve means, means subjecting the other element to pressure of fluid in the first named chamber, adjusting means operable by fluid under pressure for adjusting said other element relative to said one element to vary the area of contact between said elements, latch means operable by fluid under pressure to release said other element for adjustment and upon release of fluid under pressure to hold said other element in an adjusted condition, resilient means acting on said other element operative upon release of said latch means to move said other element relative to said one element to the position corresponding to an empty vehicle, means operable by release operation of said latch means to supply fluid under pressure to said adjusting means and to cut off such supply upon release of fluid under pressure on said latch means, a brake pipe, brake control means operable upon a reduction in pressure of fluid in said brake pipe to supply fluid under pressure to actuate said diaphragm element, unloading means for closing communication between said brake control means and diaphragm element, and for opening a vent for releasing fluid under pressure from said diaphragm element, and means operative in response to pressure of fluid in said brake pipe during charging of said brake pipe to a chosen degree for effecting operation of said unloading means to close said communication and open said vent and for supplying fluid under pressure to said latch means and operative in response to a higher pressure of fluid in said brake pipe to release fluid under pressure from said latch means, to effect operation of said unloading means to open said communication and to release fluid under pressure from said adjustment means.

4. In a vehicle fluid pressure brake appaartus, in combination, a brake cylinder device comprising a brake applying piston operable by fluid under pressure acting in one chamber to apply brakes on said vehicle and having a compensating chamber to which fluid under pressure is adapted to be supplied for opposing pressure of fluid in said one chamber, valve means controlled by pressure of fluid in said compensating chamber and an opposing force for varying pressure of fluid in said compensating chamber in accordance with the degree of such force, means for providing said force comprising a follower element and a diaphragm element adapted to be pressed one against the other with fluid under pressure acting on said diaphragm element, means connecting one of said elements to said valve means, means subjecting the other element to pressure of fluid in the first named chamber, adjusting means operable by fluid under pressure for adjusting said other element relative to said one element to vary the area of contact between said elements, latch means operable by fluid under pressure to release said other element for adjustment and upon release of fluid under pressure to hold said other element in an adjusted condition, resilient means acting on said other element operative upon release of said latch means to move said other element relative to said one element to the position corresponding to an empty vehicle, a brake pipe, brake control means operative upon a reduction in pressure of fluid in said brake pipe to supply fluid under pressure to said diaphragm element to actuate same, unloading means controlling the fluid pressure supply communication to said diaphragm element and operative by fluid under pressure to open said communication and upon release of fluid under pressure to close said communication and upon a vent for releasing fluid under pressure from said diaphragm element, and cut off means controlled by pressure of fluid in said brake pipe and operative with brake pipe pressure below a chosen degree to release controlling fluid under pressure from said unloading means and to supply fluid under pressure to said latch means and operative by an increase in brake pipe pressure above said chosen degree to supply controlling fluid under pressure to said unloading means and to release fluid under pressure from said latch means and adjusting means.

5. In a vehicle fluid pressure brake apparatus, in combination, a brake cylinder device comprising a brake applying piston operable by fluid under pressure acting in one chamber to apply brakes on said vehicle and having a compensating chamber to which fluid under pressure is adapted to be supplied for opposing pressure of fluid in said one chamber, valve means controlled by pressure of fluid in said compensating chamber and an opposing force for varying pressure of fluid in said compensating chamber in accordance with the degree of such force, means for providing said force comprising a follower element and a diaphragm element adapted to be pressed one against the other with fluid under pressure acting on said diaphragm element, means connecting one of said elements to said valve means, means subjecting the other element to pressure of fluid in the first named chamber, adjusting means operable by fluid under pressure for adjusting said other element relative to said one element to vary the area of contact between said elements, latch means operable by fluid under pressure to release said other element for adjustment and upon release of fluid under pressure to hold said other element in an adjusted condition, resilient means acting on said other element operative upon release of said latch means to move said other element relative to said one element to the position corresponding to an empty vehicle, means operable by release operation of said latch means to supply fluid under pressure to said adjusting means and to cut off such supply upon release of fluid under pressure on said latch means, a brake pipe, brake control means operable upon a reduction in pressure of fluid in said brake pipe to supply fluid under pressure to actuate said diaphragm element, unloading means for closing communication between said brake control means and diaphragm element and for opening a vent for releasing fluid under pressure from said diaphragm element, cut out means controlling communication between said valve means and brake applying means and means operative upon charging of said brake pipe to a chosen degree for effecting operation of said unloading means and cut out means to close the respective communications and to open a vent for releasing fluid under pressure from said diaphragm means and for also supplying fluid under pressure to said latch means and operative in response to a greater pressure of fluid in said brake pipe to open said communications and to close said vent and to release fluid under pressure from said latch means and said adjusting means.

6. In a vehicle fluid pressure brake apparatus, in combination, a brake cylinder device comprising a brake applying piston operable by fluid under pressure acting in one chamber to apply brakes on said vehicle and having a compensating chamber to which fluid under pressure is adapted to be supplied for opposing pressure of fluid in said one chamber, valve means controlled by pressure of fluid in said compensating chamber and an opposing force for varying pressure of fluid in said compensating chamber in accordance with the degree of such force, means for providing said force comprising a follower element and a diaphragm element adapted to be pressed one against the other with fluid under pressure acting on said diaphragm element, means connecting one of said elements to said valve means, means subjecting the other element to pressure of fluid in the first named chamber, adjusting means operable by fluid under pressure for adjusting said other element relative to said one element to vary the area of contact between said elements, latch means operable by fluid under pressure to release said other element for adjustment and upon release of fluid under pressure to hold said other element in an adjusted condition, resilient means acting on said other element operative upon release of said latch means to move said other element relative to said one element to the position corresponding to an empty vehicle, a brake pipe, brake control means operative upon a reduction in pressure of fluid in said brake pipe to supply fluid under pressure to said diaphragm element to actuate same, unloading means controlling the fluid pressure supply communication to said diaphragm element and operative by fluid under pressure to open said communication and upon release of fluid under pressure to close said communication and open a vent for releasing fluid under pressure from said diaphragm element, cut off means controlled by pressure of fluid in said brake pipe and operative with brake pipe pressure below a chosen degree to release controlling fluid under pressure from said unloading means and to supply fluid under pressure to said latch means and operative by an increase in brake pipe pressure above said chosen degree to supply controlling fluid under pressure to said unloading means and to release fluid under pressure from said latch means and adjusting means, and a valve controlling communication between said valve means and brake applying means controlled by pressure of fluid acting on said diaphragm element and operative to open such communication upon supply of fluid under pressure to act on said diaphragm element and to close such communication upon release of fluid under pressure on said diaphragm element.

7. In a fluid pressure brake apparatus for a vehicle, in combination, a brake cylinder device comprising a brake applying piston operable by fluid under pressure acting in one chamber to apply brakes on said vehicle and having a compensating chamber to which fluid under pressure is adapted to be supplied for opposing pressure of fluid in said one chamber, a passageway for conveying fluid under pressure to said one chamber, valve means for supplying fluid under pressure to said compensating chamber, load adjustable means controlled by opposing pressures of fluid in said chambers for varying pressure of fluid in said compensating chamber, adjusting means for said load adjustable means, means for closing communication between said chambers and said load adjustable means, manual means operative to close communication between said brake applying means and said one chamber and to open a vent from said one chamber for releasing fluid under pressure therefrom, and means for releasing fluid under pressure from said compensating chamber upon release of fluid under pressure from said one chamber with communication closed between said compensating chamber and said load adjustable means.

References Cited in the file of this patent

UNITED STATES PATENTS

| | | |
|---|---|---|
| 2,418,013 | Cook | Mar. 25, 1947 |
| 2,447,857 | Hewitt | Aug. 24, 1948 |